United States Patent
Araki et al.

(10) Patent No.: US 8,781,760 B2
(45) Date of Patent: Jul. 15, 2014

(54) TIRE CONDITION MONITORING METHOD AND TIRE CONDITION MONITORING SYSTEM

(75) Inventors: Yasuhiko Araki, Hiratsuka (JP); Daisuke Kanenari, Hiratsuka (JP)

(73) Assignee: The Yokohama Rubber Co., Ltd. (JP)

( * ) Notice: Subject to any disclaimer, the term of this patent is extended or adjusted under 35 U.S.C. 154(b) by 359 days.

(21) Appl. No.: 13/133,630

(22) PCT Filed: Nov. 26, 2009

(86) PCT No.: PCT/JP2009/069962
§ 371 (c)(1),
(2), (4) Date: Jun. 8, 2011

(87) PCT Pub. No.: WO2010/067715
PCT Pub. Date: Jun. 17, 2010

(65) Prior Publication Data
US 2011/0246101 A1  Oct. 6, 2011

(30) Foreign Application Priority Data
Dec. 8, 2008  (JP) .................. 2008-312070

(51) Int. Cl.
*G01F 17/00* (2006.01)
*B60Q 1/00* (2006.01)
*B60C 23/02* (2006.01)

(52) U.S. Cl.
USPC ............................ 702/50; 340/438; 73/146.4

(58) Field of Classification Search
USPC ............ 702/50, 34–36, 81, 84, 98–100, 127, 702/130, 138, 140, 182–184, 189, 193; 340/438, 442, 445, 447, 449–450; 701/29.1, 33.4, 33.7–33.9, 34.1, 34.3; 73/146, 146.3–146.4; 374/100, 137, 374/141–143
See application file for complete search history.

(56) References Cited

U.S. PATENT DOCUMENTS 5,335,540 A * 8/1994 Bowler et al. ................ 73/146.5
2002/0196137 A1* 12/2002 Poirier et al. ................. 340/442
(Continued)

FOREIGN PATENT DOCUMENTS

CN  1743823  3/2006
CN  1783159  6/2006
(Continued)

OTHER PUBLICATIONS

PCT Application PCT/JP2009/069962; filed Nov. 26, 2009; Yasuhiko Araki; ISR issued Dec. 28, 2009.

*Primary Examiner* — Toan Le
(74) *Attorney, Agent, or Firm* — Thorpe North & Western LLP

(57) ABSTRACT

A tire condition monitoring method and a monitoring system having a simple configuration and that can process data with a high degree of reliability. The method or system determines at a sensor module whether a measured value from a sensor satisfies a preset condition. If determined that the measured value does not satisfy the preset condition, at least one flag is set in the data packet to be transmitted from the sensor module. If, at the receiver, it is determined that the measured value of the received data does not to satisfy a preset condition, whether a flag is included in the received data is determined. If it is determined that the received data includes a flag, the received data is used, and if it is determined that a flag is not included, the received data is discarded.

28 Claims, 5 Drawing Sheets

(56) References Cited

U.S. PATENT DOCUMENTS

2006/0052920 A1 3/2006 Watabe
2006/0106561 A1 5/2006 Thiesen

FOREIGN PATENT DOCUMENTS

| | | |
|---|---|---|
| CN | 1848185 | 10/2006 |
| CN | 1866310 | 11/2006 |
| JP | 08-037464 | 2/1996 |
| JP | 10-135852 | 5/1998 |
| JP | 2002-240714 | 8/2002 |
| JP | 2002-319889 | 10/2002 |
| JP | 2003-072330 | 3/2003 |
| JP | 2005-132169 | 5/2005 |
| JP | 2006-031680 | 2/2006 |
| JP | 2007-071808 | 3/2007 |
| WO | WO-2008/127294 | 10/2008 |

* cited by examiner

TIRE CONDITION MONITORING METHOD AND TIRE CONDITION MONITORING SYSTEM

BACKGROUND

1. Technical Field

The technology relates to a tire condition monitoring method and a tire condition monitoring system for monitoring tire conditions.

2. Related Art

Systems exist for monitoring tire conditions. For example, tire condition monitoring systems exist that include a sensor module having a sensor that is disposed in a tire and that detects a physical property value of the tire, and a transmitter that outputs the physical property value acquired by the sensor; a receiver that receives information output from the transmitter; and a monitoring device that monitors a tire condition based on the information received from the receiver. In such tire condition monitoring systems, the acquired physical property value data is sent from the transmitter to the receiver.

Additionally, in the field of communications, when communicating data, it is common practice to insert a cyclic redundancy check (CRC) in a data packet as a technology for detecting data errors (see, for example, Japanese Unexamined Patent Application No. H10-135852A). Also, as a high level of precision is required in the field of communications, in addition to the cyclic redundancy check, for example, in some cases error-correcting codes such as BCH codes or Hamming codes are used (see, for example, Japanese Unexamined Patent Application Publication No. 2002-319889).

Tire condition monitoring systems display a relatively high degree of tolerance to errors when monitoring a physical property value of a tire. As a result, currently, cyclic redundancy checks are used as a technology for detecting errors in information sent from transmitters to receivers.

By using a technology for detecting errors such as this, even if the data sent from the sensor disposed in the tire is affected by its surroundings and an error occurs in the receiver that is mounted in a vehicle, the data in error can be discovered by a cyclic redundancy check or the like and be discarded. However, in rare cases, anomalous data that differs greatly from genuine data passes through the error detecting test and is accepted as genuine data. The probability of such misdetections occurring is high, especially in tire condition monitoring systems for use in trucks that have many sensor modules. Additionally, it is possible to increase the reliability of the data by using error-correcting codes such as BCH (Bose Hocquenghem Ray-Chaudhuri codes) or Hamming codes, but in this case, the data becomes redundant and the program becomes complicated. A complicated program is a factor that leads to an increase in equipment costs of tire condition monitoring systems.

SUMMARY

The present technology provides a tire condition monitoring method and a monitoring system having a simple configuration and that can process data with a high degree of reliability. A tire condition monitoring method of the technology provides a tire condition monitoring method for measuring a physical property value in a tire by a sensor of a sensor module mounted in the tire, transmitting data of the physical property value from the sensor module at a desired time interval, receiving the data from the sensor module by a receiver, and monitoring the physical property value based on the data received by the receiver. The method includes a step of processing send data by determining at the sensor module if a measured value from the sensor satisfies a preset condition and, if determined that the measured value does not satisfy the preset condition, at least one flag is set in a data packet transmitted from the sensor module. The method also includes a step of processing received data by determining at the receiver whether the flag is set in the received data if determined that the received data does not satisfy a preset condition. If determined that the flag is included in the received data the received data is used, and if determined that the flag is not included, the received data is discarded.

Moreover, in order to achieve the object described above, a tire condition monitoring system of the technology provides a tire condition monitoring system including: a sensor module including a sensor that detects a physical property value in a tire, a first arithmetic processing unit that processes the physical property value data detected by the sensor, and a transmission circuit for transmitting the data processed by the first arithmetic processing unit at a desired time interval; a receiver including a receiving circuit for receiving data from the sensor module, and a second arithmetic processing unit for processing the received data of the receiving circuit; and a monitoring device for monitoring the physical property value based on the data processed by the second arithmetic processing unit. The first arithmetic processing unit of the sensor module determines if a measured value from the sensor satisfies a preset condition and, if determined that the measured value does not to satisfy the preset condition, at least one flag is set in a data packet transmitted from the sensor module. If determined that a measured value of the received data does not satisfy a preset condition, the second arithmetic processing unit of the receiver determines if the flag is set in the received data. If determined that the flag is included in the received data, the received data is used, and if determined that the flag is not included in the received data, the received data is discarded.

According to the technology, when a measured value from a sensor does not satisfy a preset condition, at least one flag is set in a data packet to be transmitted from a sensor module. When the measured value does not satisfy the preset condition, at the receiver, the state of the flag of the received data is checked. The received data is used only when the flag is present. When the flag is absent, the received data is discarded. Therefore, it is possible to increase the reliability of the data without using error-correcting codes.

Additionally, when an amount of change of a measured value with respect to a previous value exceeds a preset threshold value from the sensor, at least one flag is set in the data packet to be transmitted from the sensor module. The received data is compared to the previous value at the receiver, and if the amount of change of the received data with respect to the previous value exceeds the threshold value, the state of the flag of the received data is checked. The received data is used only when the flag is present. When the flag is absent, the received data is discarded. Therefore, it is possible to increase the reliability of the data without using error-correcting codes.

Moreover, when a measured value from the sensor exceeds a preset threshold value, at least one flag is set in the data packet to be transmitted from the sensor module. If the received data exceeds the threshold value at the receiver, the state of the flag of the received data is checked. The received data is used only when the flag is present. When the flag is absent, the received data is discarded. Therefore, it is possible to increase the reliability of the data without using error-correcting codes.

Examples of the physical property values to be monitored include air pressure and temperature, and the monitoring of air temperature and temperature can be applied to both the first technology and the second technology. However, the monitoring of air pressure is suitable for the first technology as the first technology uses the relative change of the physical property value as an indicator, and the monitoring of temperature is suitable for the second technology as the second technology uses the absolute change of the physical property value as an indicator.

In cases of determining based on an amount of change, when the physical property value is air pressure, the threshold value is preferably 20 kPa/min or greater. By setting the threshold value to be greater than a speed at which the air pressure of the tire changes naturally due to heat generation when travelling, errors can be appropriately determined.

In cases when determining based on a measured value when the physical property value is temperature, the threshold value is preferably 60° C. or higher. By setting the threshold value to be greater than a normal temperature reached by a tire due to heat generation when travelling, errors can be appropriately determined.

Additionally, when the sensor acquires data that satisfies an additional requirement of the flag, the flag is set, and, preferably, at the same time, data transmission from the sensor module is performed via a second transmission interval that is shorter than a normal first transmission interval. Furthermore, it is more preferable that the second transmission interval be ½ of the first transmission interval or shorter. Thus, when anomalous data is detected, data transmission is performed via a shorter transmission interval, and therefore the reliability of the data can be further increased.

Additionally, when an abnormal value in which a flag was not set at the receiver is acquired three times or more, it is preferable for the error to be determined to be due to the receiver. Thereby, the possibility of data being continuously discarded due to an error of the receiver can be eliminated.

BRIEF DESCRIPTION OF THE DRAWINGS

FIG. 2-1 is a flowchart illustrating the first embodiment of the tire condition monitoring method of the technology.

FIG. 2-2 is a flowchart illustrating the first embodiment of the tire condition monitoring method of the technology.

FIG. 3-1 is a flowchart illustrating a second embodiment of the tire condition monitoring method of the technology.

FIG. 3-2 is a flowchart illustrating the second embodiment of the tire condition monitoring method of the technology.

DETAILED DESCRIPTION

Figure 1:
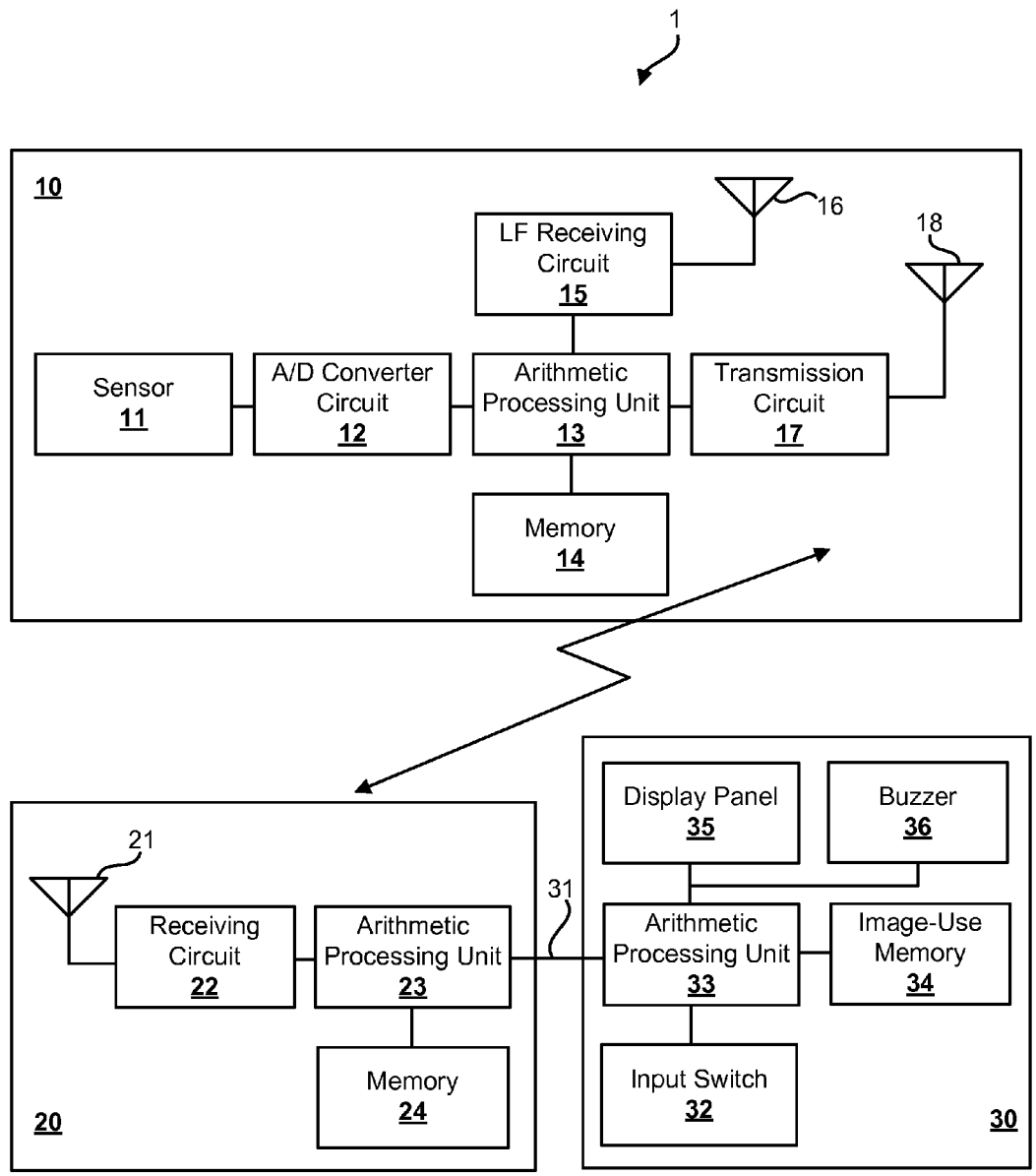
FIG. 1 is a component diagram illustrating a first embodiment of a tire condition monitoring system of the technology.

Detailed descriptions will be given below of a configuration of the technology with reference to the accompanying drawings. FIG. 1 is a component diagram illustrating a first embodiment of a tire condition monitoring system of the technology. The configuration of the tire condition monitoring system can be applied to both the first technology and the second technology by changing the functions of the first arithmetic processing unit and the second arithmetic processing unit.

As illustrated in FIG. 1, a tire condition monitoring system 1 includes a sensor module 10, a receiver 20, and a monitoring device 30. The sensor module 10 is mounted in a tire (on a tire inside surface or on a rim peripheral surface), the receiver 20 is mounted on a vehicle body part of a vehicle, and the monitoring device 30 is mounted on a driver's seat of the vehicle.

The sensor module 10 includes a sensor 11 that detects a physical property value in the tire, an A/D converter circuit 12 that is connected to the sensor 11, an arithmetic processing unit 13 (first arithmetic processing unit) that is connected to the A/D converter circuit 12, a memory 14 that is connected to the arithmetic processing unit 13, a low frequency (LF) receiving circuit 15 that is connected to the arithmetic processing unit 13, a receiving antenna 16 that is connected to the LF receiving circuit 15, a transmission circuit 17 that is connected to the arithmetic processing unit 13, and a transmitting antenna 18 that is connected to the transmission circuit 17.

The sensor 11 detects a physical property value in the tire. Examples of the physical property value detected by the sensor 11 include air pressure, temperature, and the like. Of course, it is also possible to provide a plurality of the sensor 11 and simultaneously detect multiple physical property values. The A/D converter circuit 12 converts a detected value output in analog (or, the detected value output as an analog signal) by the sensor 11 to a digital output (or, the detected value as a digital signal). The arithmetic processing unit 13 performs a predetermined process on the data (the detected value) of the physical property value that was detected by the sensor 11 and converted to digital output by the A/D converter circuit 12. The memory 14 is a storage device that stores information necessary for the processing of the arithmetic processing unit 13 and supplies information stored therein to the arithmetic processing unit 13. The receiving antenna 16 and the LF receiving circuit 15 receive LF signals transmitted from external components and send received signals to the arithmetic processing unit 13. The sensor module 10 sets an operating mode and confirms setting data of the arithmetic processing unit 13 based on the LF signals received via the receiving antenna 16 and the LF receiving circuit 15. The transmission circuit 17 transmits the data processed by the arithmetic processing unit 13 across a preset transmission interval via the transmitting antenna 18.

The receiver 20 includes a receiving circuit 22 provided with a receiving antenna 21, an arithmetic processing unit 23 (second arithmetic processing unit) that is connected to the receiving circuit 22, and a memory 24 that is connected to the arithmetic processing unit 23.

The receiving circuit 22 receives the data transmitted by the sensor module 10 via the receiving antenna 21. The arithmetic processing unit 23 performs a predetermined process on the data received by the receiving circuit 22. The memory 24 is a storage device that stores information necessary for the processing of the arithmetic processing unit 23 and supplies information stored therein to the arithmetic processing unit 23.

The monitoring device 30 includes an arithmetic processing unit 33 (third arithmetic processing unit) that is connected to the arithmetic processing unit 23 of the receiver 20 via a communication cable 31, an image-use memory 34 that is connected to the arithmetic processing unit 33, an input switch 32 that is connected to the arithmetic processing unit 33, and a display panel 35 and buzzer 36 that are connected to the arithmetic processing unit 33.

The input switch 32 is a switch for actuating the monitoring device 30. The arithmetic processing unit 33 performs a predetermined process on the data processed by the arithmetic processing unit 23 of the receiver 20. The image-use memory 34 is a storage device that stores information necessary for the processing of the arithmetic processing unit 33 and supplies information stored therein to the arithmetic processing unit 33. The display panel 35 is configured to perform a predetermined display based on the processing results of the arithmetic processing unit 33. Additionally, the buzzer 36 is configured to emit a predetermined alarm based on the processing results of the arithmetic processing unit 33.

Figures 1, 2:
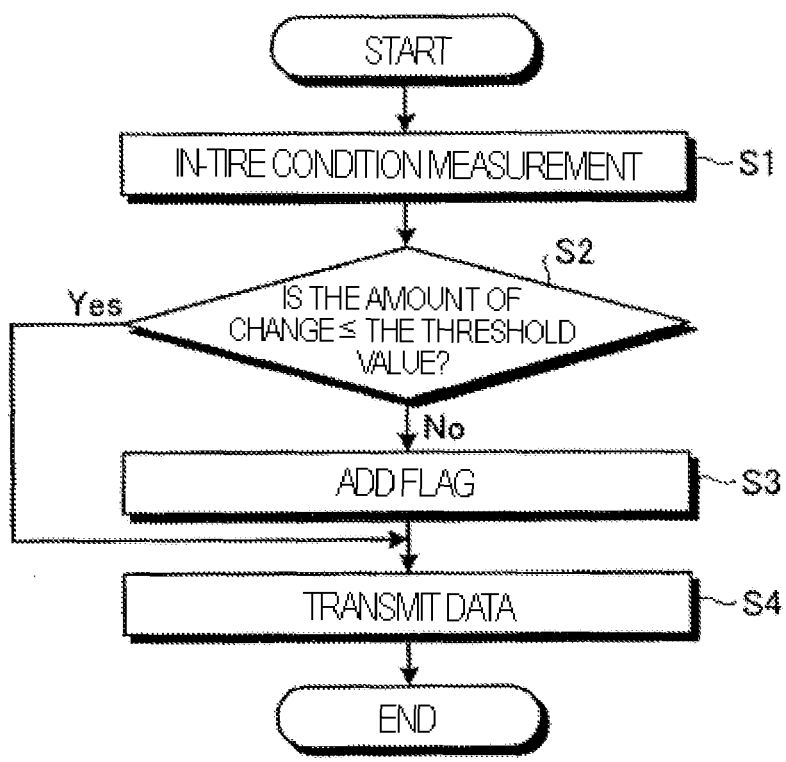
Figure 2:
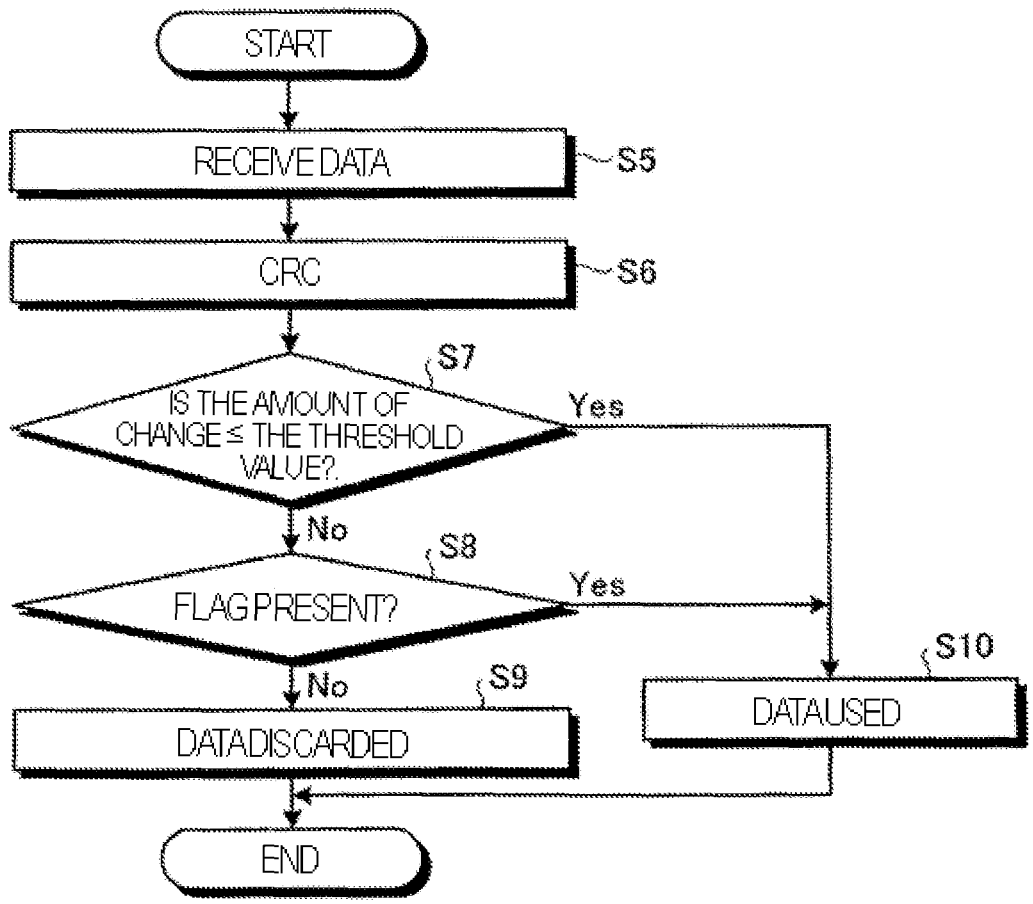

Next, a method for monitoring the air pressure in a tire using the tire condition monitoring system 1 described above will be described using FIGS. 2-1 and 2-2. Here, FIGS. 2-1 and 2-2 are flowcharts illustrating the first embodiment of the tire condition monitoring method of the technology. More specifically, FIG. 2-1 is a flowchart illustrating processing performed in the sensor module and FIG. 2-2 is a flowchart illustrating processing performed in the receiver and the monitoring device.

First, as illustrated in FIG. 2-1, using the sensor 11, the sensor module 10 measures the air pressure as the physical property value in the tire (step S1). The sensor module 10 inputs the air pressure data detected by the sensor 11 into the arithmetic processing unit 13 after converting the data from analog data to digital data by the A/D converter circuit 12. The arithmetic processing unit 13 compares the measured value from the sensor 11 with previous data and determines if a difference between the previous data and the current data (the measured value), in other words, an amount of change, is less than or equal to a threshold value (step S2). Note that the threshold value of the amount of change is a preset value. Then, if the sensor module 10 determines if the amount of change from the previous data of the measured data from the sensor 11 exceeds the preset threshold value, or, in other words, if the amount of change at the arithmetic processing unit 13 is determined to be greater than the threshold value (No), at least one flag is set in the data packet to be transmitted from the sensor module 10 (step S3). Additionally, if, in step S2, the sensor module 10 determines that the amount of change from the previous data of the measured value from the sensor 11 is less than or equal to the threshold value (Yes), that data is transmitted from the transmission circuit 17 via the transmitting antenna 18 without adding the flag (step S4). In other words, the sensor module 10 transmits data that does not include the flag if the amount of change is less than or equal to the threshold value. Additionally, the sensor module 10 also transmits the data that in which a flag was set at step S3 from the transmission circuit 17 via the transmitting antenna 18 (step S4). In other words, the sensor module 10 transmits data, after adding a flag thereto, if the amount of change is greater than the threshold value.

Here, the threshold value is preferably 20 kPa/min or greater, and more preferably from 20 kPa/min to 1400 kPa/min. By setting the threshold value to be greater than a speed at which the air pressure of the tire changes naturally due to heat generation when travelling, errors can be appropriately determined. Note that "amount of change" as used herein refers to an absolute value of the difference between current data and previous data. In other words, when the current data is excessively greater than the previous data, or when the current data is excessively less than the previous data, a flag is added.

Examples of a transmission data frame include data frames having a preamble, a frame synchronization code, an ID, flag information, a datum 1, a datum 2, a datum 3, a CRC, and a postamble in sequence. Regarding the flag information, for example, 000000000 can be set to indicate the absence of the flag (that the amount of change of the measured air pressure is less than or equal to the threshold value), and 000010000 can be set to indicate the presence of the flag (that the amount of change of the measured air pressure exceeds the threshold value).

Next, as illustrated in FIG. 2-2, the receiver 20 that is mounted on the vehicle body receives the data transmitted from the transmission circuit 17 via the receiving antenna 21 and the receiving circuit 22 (step S5). Then, the receiver 20, after performing a cyclic redundancy check (CRC) (step S6) via the arithmetic processing unit 23, compares the received data of the receiving circuit 22 to the previous data, and specifically determines if the amount of change is less than or equal to the threshold value (step S7). Here, when the amount of change from the previous data of the received data in step S7 exceeds the threshold value that is preset to the same value as the sensor module 10, the arithmetic processing unit 23 of the receiver 20 checks a state of the flag of the received data (step S8). In other words, if the arithmetic processing unit 23 determines that the amount of change is greater than the threshold value at step S7 (No), the presence of a flag is determined in step S8. The received data is used only when the flag is present and the data is discarded when the flag is absent (step S9). When the amount of change from the previous data of the received data is determined to be less than or equal to the preset threshold value that data is used as valid data (step S10). Additionally, data that have been confirmed to include a flag are also used as valid data (step S10).

In other words, if the arithmetic processing unit 23 determines in step S8 that there is no flag (No), the data to be processed are discarded in step S9. Additionally, if the arithmetic processing unit 23 determines in step S8 that there is a flag (Yes), the data are determined to be valid and are used in step S10. Also, if the arithmetic processing unit 23 determines in step S7 that the amount of change is less than or equal to the threshold value (Yes), the data are determined to be valid and are used in step S10.

For example, in a case where the air pressure declines from 900 kPa to 780 kPa due to a puncture or the like at a rate that exceeds the threshold value, send data including a flag is transmitted. Then, the received data of 780 kPa is recognized as a valid measurement value based on the presence of the flag. On the other hand, in cases when data transmitted as 900 kPa is, for some reason, unintentionally changed to 550 kPa, the send data will not have a flag. In these cases, the received data will show a value of 550 kPa, but that data will be discarded because it does not have a flag.

Specifically, after the measurement value of the air pressure (i.e. 900 kPa) in a normal state is measured by the sensor module 10, if the air pressure changes due to a puncture or the like, a measured value of the air pressure that has changed in excess of the threshold value (i.e. 780 kPa) is detected. When the amount of change of the measured value exceeds the threshold value in this way, the sensor module 10 adds a flag and transmits the data. When the amount of change of the received data exceeds the threshold value and the received data includes a flag, the receiver 20 determines that the measured value (detected value) is valid and uses the received data as valid data. On the other hand, after the measurement value of the air pressure (i.e. 900 kPa) in a normal state is measured, if a measured value of the air pressure is detected that does not exceed the threshold value, the sensor module 10 transmits the data without adding a flag. In such cases, there is a possibility that, for some reason, the values of the measured value of the transmitted data and the measured value of the received data will differ, and that the measured value of the received data by the receiver 20 will be a measured value having an amount of change from the previous measured value that exceeds the threshold value (i.e. 550 kPa). However, even when the measured value received by the receiver 20 changes and becomes a measured value having an amount of change that exceeds the threshold value, because the data does not include a flag, the receiver 20 determines that the measured value is anomalous and discards the data.

Next, in the tire condition monitoring system 1, the data that was determined to be valid information and, thus, usable data by the receiver 20, is input into the arithmetic processing unit 33 of the monitoring device 30. The arithmetic processing unit 33 displays the data as air pressure information on the display panel 35. Additionally, the arithmetic processing unit 33 compares the current data with the previous data. If the current data exceeds a preset threshold value with respect to previous data, the display panel 35 displays a warning image and/or the buzzer 36 sounds an alarm. Note that the threshold value of the arithmetic processing unit 33 may be the same as the threshold value of the sensor module 10 or may be a different value.

According to the tire condition monitoring method described above, the relative amount of change of the physical property value (air pressure) is checked as an indicator of anomalous data in addition to a regular CRC check being performed. Therefore, an error rate of the received data can be significantly reduced without causing redundancies in the packet. Of course, the algorithm can be greatly simplified compared to cases in which error-correcting codes such as BCH codes, Hamming codes, or the like are inserted.

In other words, by adding a flag, the tire condition monitoring system 1 can determine whether the data (the value of the amount of change exceeding the threshold value) received by the receiver 20 is invalid data (anomalous data) that changed, for example, when the data was transmitted, or if the data is a detected value that was properly detected by the sensor 11. Thereby, data exceeding the threshold value, rather, data that requires the issuance of an alert or the like, can be judged for validity based on two pieces of information: the detected value and the flag. Therefore, mis-detections can be suppressed and detection precision can be enhanced. Therefore, by determining whether data exceeding the threshold value is valid or not, regardless of cases where there are no problems with a tire, the possibility of an alert being output can be reduced.

Additionally, in the embodiment described above, whether data is valid or not can be determined with more accuracy. Therefore, while error detection was performed by running a CRC check, this CRC check is not absolutely necessary.

Figures 1, 3:
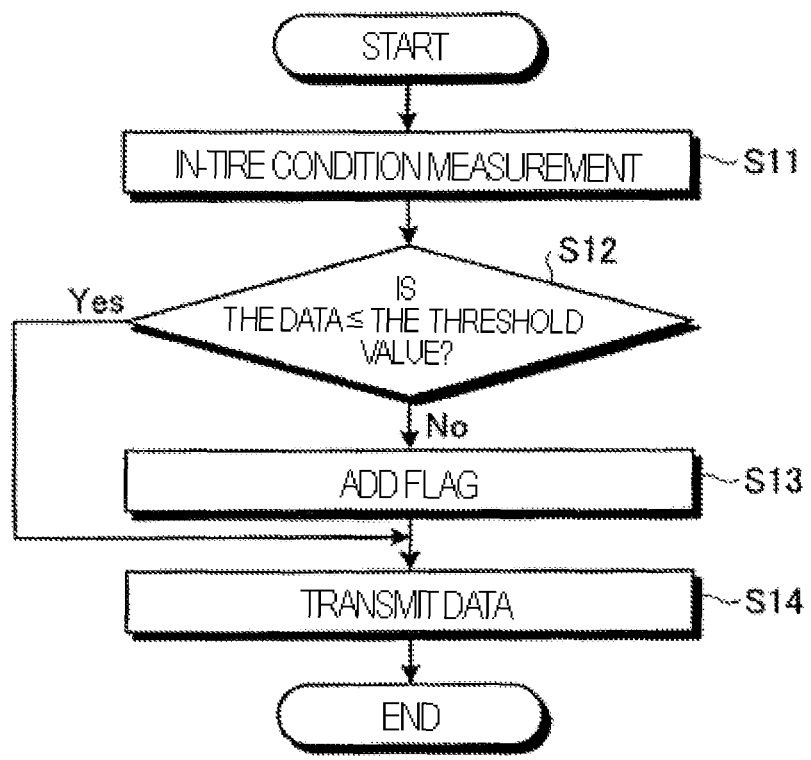
Figures 2, 3:
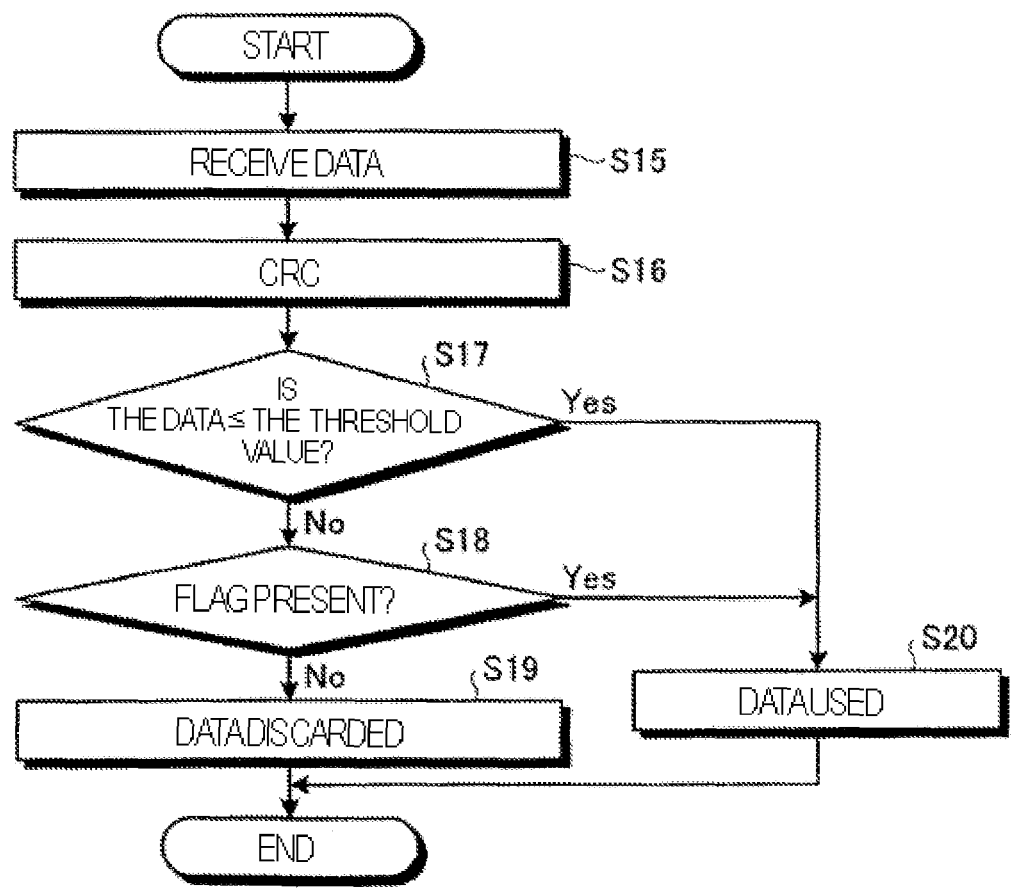

Next, another method for monitoring a temperature in a tire using the tire condition monitoring system 1 described above will be described using FIGS. 3-1 and 3-2. Here, FIGS. 3-1 and 3-2 are flowcharts illustrating a second embodiment of the tire condition monitoring method of the technology. More specifically, FIG. 3-1 is a flowchart illustrating processing performed in the sensor module and FIG. 3-2 is a flowchart illustrating processing performed in the receiver and the monitoring device.

First, as illustrated in FIG. 3-1, the sensor module 10 measures the temperature as the physical property value in the tire (step S11) via the sensor 11. The sensor module 10 inputs the temperature data detected by the sensor 11 into the arithmetic processing unit 13 after converting the data from analog data to digital data via the A/D converter circuit 12. The arithmetic processing unit 13 compares the measured value from the sensor 11 with a preset threshold value and determines if the measured value is less than or equal to the threshold value (step S12). Note that the threshold value is a preset value. Then, if the sensor module 10 determines that the measured data from the sensor 11 exceeds the preset threshold value, or, in other words, if the measured value at the arithmetic processing unit 13 is determined to be greater than the threshold value (No), at least one flag is set in the data packet to be transmitted from the sensor module 10 (step S13). Additionally, if, in step S12, the sensor module 10 determines that the measured value from the sensor 11 is less than or equal to the threshold value (Yes), that data is transmitted from the transmission circuit 17 via the transmitting antenna 18 without adding a flag (step S14). In other words, the sensor module 10 transmits data that does not include a flag if the measured value is less than or equal to the threshold value. Additionally, the sensor module 10 also transmits the data that includes a flag of step S13 from the transmission circuit 17 via the transmitting antenna 18 (step S14). In other words, the sensor module 10 transmits data that includes a flag if the measured value is greater than the threshold value.

Here, the threshold value is preferably 60° C. or higher, and more preferably from 60° C. to 130° C. By setting the threshold value to be greater than a normal temperature reached by a tire due to heat generation when travelling, errors can be appropriately determined.

Examples of a transmission data frame include data frames having a preamble, a frame synchronization code, an ID, flag information, a datum 1, a datum 2, a datum 3, a CRC, and a postamble in sequence. Regarding the flag information, for example, 000000000 can be set to indicate the absence of the flag (that the measured temperature is less than or equal to the threshold value), and 000010000 can be set to indicate the presence of the flag (that the measured temperature exceeds the threshold value).

Next, as illustrated in FIG. 3-2, the receiver 20 that is mounted on the vehicle body receives the data transmitted from the transmission circuit 17 via the receiving antenna 21 and the receiving circuit 22 (step S15). Then, the arithmetic processing unit 23 of the receiver 20, after performing a CRC (step S16), compares the received data of the receiving circuit 22 to a threshold preset to the same value as in the sensor module 10, and specifically determines if the measured value is less than or equal to the threshold value at (step S17). Here, when the received data of step S17 exceeds the preset threshold value, the arithmetic processing unit 23 of the receiver 20 checks a state of the flag of the received data (step S18). In other words, if the arithmetic processing unit 23 determines that the measured value is greater than the threshold value at step S17 (No), the presence of a flag is determined in step S18. The received data is used only when a flag is present and the data is discarded when the flag is absent (step S19). When the received data are determined to be less than or equal to the preset threshold value, those data are used as valid data (step S20). Additionally, data that have been confirmed to include a flag are also used as valid data (step S20).

In other words, if the arithmetic processing unit 23 determines in step S18 that there is no flag (No), that data to be processed is discarded in step S19. Additionally, if the arithmetic processing unit 23 determines in step S18 that there is a flag (Yes), the data is determined to be valid and is used in step S20. Also, if the arithmetic processing unit 23 determines in step S17 that the measured value is less than or equal to the threshold value (Yes), the data is determined to be valid and is used in step S20.

For example, in a case when the temperature increases from 50° C. to 80° C. due to a tire failure or the like at a rate that exceeds the threshold value, send data that includes a flag is transmitted. Then, the received data of 80° C. is recognized as a valid measurement value (measurement) based on the presence of the flag. On the other hand, in cases when data transmitted as 50° C. is, for some reason, unintentionally changed to 80° C., the send data will not have a flag. In these cases, the received data will show a value of 80° C., but those data will be discarded because they do not have a flag.

Specifically, after the measurement value of the temperature in a normal state (i.e. 50° C.) is measured by the sensor module 10, if the temperature changes due to a tire failure or the like, a temperature exceeding the threshold value (i.e. 80° C.) is measured. When the measured value exceeds the threshold value in this way, the sensor module 10 adds a flag and transmits the data. When the measured value of the received data exceeds the threshold value and the received data includes a flag, the receiver 20 determines that the measured value is valid and uses the received data as valid data. On the other hand, after the measurement value of the temperature (i.e. 50° C.) in a normal state is detected, if a measured value of a temperature is detected that does not exceed the threshold value, the sensor module 10 transmits the data without adding a flag. In such cases, there is a possibility that, for some reason, the measured value of the transmitted data and the received measured value will differ, and that the measured value of the received data by the receiver 20 will become a measured value that exceeds the threshold value (i.e. 80° C.). However, even when the measured value changes and becomes a measured value that exceeds the threshold value, because the data does not include a flag, the receiver 20 determines that the measured value is anomalous and discards the data.

Next, in the tire condition monitoring system 1, the data that was determined by the receiver 20 to be valid information and, thus, usable data, is input into the arithmetic processing unit 33 of the monitoring device 30. The arithmetic processing unit 33 displays the data as temperature information on the display panel 35. Additionally, the arithmetic processing unit 33 compares the current data with the preset threshold value. If the current data exceeds the preset threshold value, the display panel 35 displays a warning image and/or the buzzer 36 sounds an alarm. Note that the threshold value of the arithmetic processing unit 33 may be the same as the threshold value of the sensor module 10 or may be a different value.

According to the tire condition monitoring method described above, the absolute amount of change of the physical property value (temperature) is checked as an indicator of anomalous data in addition to a regular CRC check being performed. Therefore, an error rate of the received data can be significantly reduced without causing redundancies in the packet. Of course, the algorithm can be greatly simplified compared to cases in which error-correcting codes such as BCH codes, Hamming codes, or the like are inserted.

In other words, as in the embodiment, even when determination is performed based on the measured value, by adding a flag, the tire condition monitoring system 1 can determine whether the data (the value of the measured value exceeding the threshold value) received by the receiver 20 is invalid data (anomalous data) that changed, for example, when the data was transmitted, or if the data is a detected value that was properly detected by the sensor 11. Thereby, data exceeding the threshold value, or rather, data that requires the issuance of an alert or the like, can be judged for validity based on two pieces of information: the detected value and the flag. Therefore, mis-detections can be suppressed and detection precision can be enhanced. Therefore, by determining whether data exceeding the threshold value is valid or not, regardless of cases where there are no problems with a tire, the possibility of an alert being output can be reduced.

In each of the embodiments described above, the transmission interval from the sensor module 10 may be set so as to always be constant, or may be set so as to change when an abnormal change is observed in a physical property value. Specifically, when the sensor 11 acquires data that satisfies the additional requirement of the flag, the arithmetic processing unit 13 of the sensor module 10 sets a flag in the data packet, and, simultaneously, switches an operating mode of the transmission circuit 17 so that data transmission from the sensor module 10 is performed via a transmission interval B (second transmission interval) that has a shorter interval than a normal transmission interval A (first transmission interval). By performing data transmission via the shorter transmission interval B, the reliability of the data can be further increased. Additionally, the transmission interval B is preferably ½ or shorter and more preferably from 1/10 to ½ of the transmission interval A. For example, when the normal transmission interval A is 30 seconds, the transmission interval B is preferably 10 seconds.

Additionally, when an abnormal value (a value that exceeds the threshold value) in which a flag was not set at the receiver 20 is acquired three times or more, the arithmetic processing unit 23 of the receiver 20 preferably communicates a determination result of abnormality to the monitoring device 30. It is preferable that an algorithm be provided that determines that the receiver 20 is in error when the arithmetic processing unit 23 consecutively receives an abnormal value three times that does not have a flag (data to be discarded as data in error). Thereby, the possibility of data being continuously discarded due to an error of the receiver 20 can be eliminated. Additionally, a user can be notified that communication errors are occurring frequently and inspections and maintenance can be performed promptly.

Additionally, the tire condition monitoring method and monitoring system described above can be mounted on various types of vehicles, but is particularly suited for use on trucks, buses, and trailers. In other words, it is suitable for use as a tire condition monitoring method and monitoring system of tires mounted on trucks, buses, and trailers. More specifically, it is suitable for cases where a number of sensor modules wirelessly transmitting to the receiver is six or more. With such a vehicle, the ability to discard anomalous data is extremely useful because the probability of data collisions occurring increases. A maximum number of sensor modules is not particularly limited, and is, for example, 30.

As described above, the tire condition monitoring method and tire condition monitoring system according to the technology are suitable for use as a method and system for detecting conditions of tires mounted on a vehicle or the like.

What is claimed is:

1. A tire condition monitoring method for measuring a physical property value in a tire by a sensor of a sensor module mounted in the tire, transmitting data of the physical property value from the sensor module at a desired time interval, receiving the data from the sensor module by a receiver, and monitoring the physical property value based on the data received by the receiver; the method comprising the steps of:

processing send data by first determining at the sensor module whether an amount of change with respect to a previous value of a measured value of the physical property value from the sensor exceeds a threshold, and, if determined that the amount of change with respect to the previous value of the measured value exceeds the threshold, at least one flag is set in a packet of the send data from the sensor module; and processing received data by second determining at the receiver whether an amount of change with respect to a previous value of the measured value of the physical property value of received data from the sensor module exceeds a threshold, and, if determined that the amount of change with respect to the previous value of the received data does not exceed the threshold, determining at the receiver whether the flag is set in the received data; and using the received data if determined that the flag is included in the received data, and discarding the received data if determined that the flag is not included.

2. The tire condition monitoring method according to claim 1, wherein the physical property value is air pressure, and the threshold value is 20 kPa/min or greater.

3. The tire condition monitoring method according to claim 1, wherein in the step of processing send data, in cases where the sensor acquires data that satisfies an additional requirement of the flag, the data is transmitted from the sensor module via a second transmission interval that has a shorter interval than a normal first transmission interval.

4. The tire condition monitoring method according to claim 3, wherein the second transmission interval is an interval that is ½ of the first transmission interval or shorter.

5. The tire condition monitoring method according to claim 1 for monitoring a tire condition of a tire mounted on a truck, bus, or trailer.

6. The tire condition monitoring method according to claim 1, wherein a number of the sensor modules wirelessly transmitting to the receiver is six or more.

7. The tire condition monitoring method according to claim 1, further comprising a step of determining that the receiver is in error when a value that exceeds the threshold in which a flag was not set at the receiver is acquired three times or more.

8. A tire condition monitoring method for measuring a physical property value in a tire by a sensor of a sensor module mounted in the tire,
transmitting data of the physical property value from the sensor module at a desired time interval, receiving the data from the sensor module by a receiver, and monitoring the physical property value based on the data received by the receiver; the method comprising the steps of:
processing send data by first determining at the sensor module whether a measured value of the physical property value from the sensor exceeds a preset threshold, and, if determined that the measured value of the physical property value exceeds the preset threshold, at least one flag is set in a packet of the send data from the sensor module; and
processing received data by second determining at the receiver whether received data from the sensor module exceeds a preset threshold, and, if determined that the received data does not exceed the preset threshold, determining at the receiver whether the flag is set in the received data; and using the received data if determined that the flag is included in the received data, and discarding the received data if determined that the flag is not included.

9. The tire condition monitoring method according to claim 8, wherein the physical property value is a temperature, and the threshold value is 60° C. or higher.

10. The tire condition monitoring method according to claim 8, wherein in the step of processing send data, in cases where the sensor acquires data that satisfies an additional requirement of the flag, the data is transmitted from the sensor module via a second transmission interval that has a shorter interval than a normal first transmission interval.

11. The tire condition monitoring method according to claim 10, wherein the second transmission interval is an interval that is ½ of the first transmission interval or shorter.

12. The tire condition monitoring method according to claim 8 for monitoring a tire condition of a tire mounted on a truck, bus, or trailer.

13. The tire condition monitoring method according to claim 8, wherein a number of the sensor modules wirelessly transmitting to the receiver is six or more.

14. The tire condition monitoring method according to claim 8, further comprising a step of determining that the receiver is in error when a value that exceeds the threshold in which a flag was not set at the receiver is acquired three times or more.

15. A tire condition monitoring system comprising:
a sensor module including a sensor that detects a physical property value in a tire, a first arithmetic processing unit that processes the physical property value data detected by the sensor, and a transmission circuit for transmitting the data processed by the first arithmetic processing unit at a desired time interval;
a receiver including a receiving circuit for receiving data from the sensor module, and a second arithmetic processing unit for processing the received data of the receiving circuit; and a monitoring device for monitoring the physical property value based on the data processed by the second arithmetic processing unit, wherein
the first arithmetic processing unit of the sensor module first determines whether an amount of change with respect to a previous value of a measured value of the physical property value from the sensor exceeds a preset threshold, and, if determined that the amount of change with respect to the previous value of the measured value of the physical property value exceeds the preset threshold, at least one flag is set in a packet of the send data from the sensor module; and
the second arithmetic processing unit of the receiver compares the received data of the receiving circuit with the previous value of the measured value of the physical property value, and second determines whether an amount of change with respect to a previous value of the received data from the sensor module exceeds the preset threshold, and, if determined that an amount of change with respect to the previous value of the received data exceeds the threshold, determines whether the flag is set in the received data; and if determined that the flag is included in the received data, uses the received data, and if determined that the flag is not included, discards the received data.

16. The tire condition monitoring system according to claim 15, wherein the physical property value is air pressure, and
the threshold value is 20 kPa/min or greater.

17. The tire condition monitoring system according to claim 15, wherein when the sensor acquires data that satisfies an additional requirement of the flag, the first arithmetic processing unit of the sensor module sets the flag and, simultaneously, switches an operating mode of the transmission circuit from an operating mode in which data transmitting is performed via a normal first transmission interval to an operating mode in which data transmitting is performed via a second transmission interval that has a shorter transmission interval.

18. The tire condition monitoring system according to claim 17, wherein the second transmission interval is a transmission interval that is ½ of the first transmission interval or shorter.

19. The tire condition monitoring system according to claim 15 for monitoring a tire condition of a tire mounted on a truck, bus, or trailer.

20. The tire condition monitoring system according to claim 15, wherein a number of the sensor modules wirelessly transmitting to the receiver is six or more.

21. The tire condition monitoring system according to claim 15, wherein when the second arithmetic processing unit of the receiver acquires a value that exceeds the threshold in which a flag was not set at the receiver three times or more, a determination result that the receiver is in error is communicated to the monitoring device.

22. A tire condition monitoring system comprising:
a sensor module including a sensor that detects a physical property value in a tire, a first arithmetic processing unit that processes the physical property value data detected by the sensor, and a transmission circuit for transmitting the data processed by the first arithmetic processing unit at a desired time interval;
a receiver including a receiving circuit for receiving data from the sensor module, and a second arithmetic processing unit for processing the received data of the receiving circuit; and a monitoring device for monitoring the physical property value based on the data processed by the second arithmetic processing unit, wherein
the first arithmetic processing unit of the sensor module first determines whether a measured value of the physical property value from the sensor exceeds a preset threshold, and, if determined that the measured value of the physical property value exceeds the preset threshold, at least one flag is set in a packet of the send data from the sensor module; and
the second arithmetic processing unit of the receiver compares the received data of the receiving circuit with the threshold, and second determines whether the received data exceeds the threshold, and, if determined that the received data exceeds the threshold, determines whether the flag is set in the received data; and if determined that the flag is included in the received data, uses the received data, and if determined that the flag is not included, discards the received data.

23. The tire condition monitoring system according to claim 22, wherein the physical property value is a temperature, and
the threshold value is 60° C. or higher.

24. The tire condition monitoring system according to claim 22, wherein when the sensor acquires data that satisfies an additional requirement of the flag, the first arithmetic processing unit of the sensor module sets the flag and, simultaneously, switches an operating mode of the transmission circuit from an operating mode in which data transmitting is performed via a normal first transmission interval to an operating mode in which data transmitting is performed via a second transmission interval that has a shorter transmission interval.

25. The tire condition monitoring system according to claim 24, wherein the second transmission interval is a transmission interval that is ½ of the first transmission interval or shorter.

26. The tire condition monitoring system according to claim 22 for monitoring a tire condition of a tire mounted on a truck, bus, or trailer.

27. The tire condition monitoring system according to claim 22, wherein a number of the sensor modules wirelessly transmitting to the receiver is six or more.

28. The tire condition monitoring system according to claim 22, wherein when the second arithmetic processing unit of the receiver acquires a value that exceeds the threshold in which a flag was not set at the receiver three times or more, a determination result that the receiver is in error is communicated to the monitoring device.

* * * * *